United States Patent
Yu et al.

(10) Patent No.: US 10,223,676 B2
(45) Date of Patent: *Mar. 5, 2019

(54) RELEASE OF FUNDS BASED ON CRITERIA

(71) Applicant: PayPal, Inc., San Jose, CA (US)

(72) Inventors: Kevin John Yu, Cerritos, CA (US); Joseph Chong, San Francisco, CA (US); Alan Tien, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 1066 days.

This patent is subject to a terminal disclaimer.

(21) Appl. No.: 14/257,827

(22) Filed: Apr. 21, 2014

(65) Prior Publication Data

US 2014/0229370 A1   Aug. 14, 2014

Related U.S. Application Data

(63) Continuation of application No. 11/238,359, filed on Sep. 29, 2005, now Pat. No. 8,706,618.

(51) Int. Cl.
    G06Q 40/00 (2012.01)
    G06Q 20/10 (2012.01)
    G06Q 30/06 (2012.01)
    G06Q 40/02 (2012.01)

(52) U.S. Cl.
    CPC ........... *G06Q 20/102* (2013.01); *G06Q 20/10* (2013.01); *G06Q 30/0609* (2013.01); *G06Q 40/02* (2013.01)

(58) Field of Classification Search
    CPC ... G06Q 20/10; G06Q 20/102; G06Q 30/0609
    See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,106,060 A | 8/1978 | Chapman, Jr. |
| 4,123,747 A | 10/1978 | Lancto et al. |
| 4,255,796 A | 3/1981 | Gabbe et al. |
| 4,317,957 A | 3/1982 | Sendrow |
| 4,326,098 A | 4/1982 | Bouricius et al. |
| 4,386,266 A | 5/1983 | Chesarek |
| 4,412,287 A | 10/1983 | Braddock, III |
| 4,528,643 A | 7/1985 | Freeny, Jr. |

(Continued)

FOREIGN PATENT DOCUMENTS

| | | |
|---|---|---|
| EP | 1643340 A2 | 4/2006 |
| EP | 1647933 A1 | 4/2006 |

(Continued)

OTHER PUBLICATIONS

"ADESA, Inc. Partners with Escrow.com to Provide Inspection Services to Online Vehicle Purchasers", PRNewswire, (Jun. 30, 2005), 2 p.

(Continued)

*Primary Examiner* — Steven S Kim
(74) *Attorney, Agent, or Firm* — Maschoff Brennan

(57) ABSTRACT

A method and system to transfer payment to a seller of a network-based commerce transaction are described herein. The method includes performing a risk evaluation based on retrieved seller-specific data, and releasing funds from a holding account to the seller based on the risk evaluation.

20 Claims, 5 Drawing Sheets

(56) References Cited

U.S. PATENT DOCUMENTS

| | | |
|---|---|---|
| 4,532,554 A | 7/1985 | Skala |
| 4,645,873 A | 2/1987 | Chomet |
| 4,673,802 A | 6/1987 | Ohmae et al. |
| 4,674,044 A | 6/1987 | Kalmus et al. |
| 4,674,066 A | 6/1987 | Kucera |
| 4,677,552 A | 6/1987 | Sibley, Jr. |
| 4,694,397 A | 9/1987 | Grant et al. |
| 4,707,592 A | 11/1987 | Ware |
| 4,713,761 A | 12/1987 | Sharpe et al. |
| 4,727,243 A | 2/1988 | Savar |
| 4,731,842 A | 3/1988 | Smith |
| 4,744,050 A | 5/1988 | Hirosawa et al. |
| 4,755,940 A | 7/1988 | Brachtl et al. |
| 4,759,063 A | 7/1988 | Chaum |
| 4,759,064 A | 7/1988 | Chaum |
| 4,789,928 A | 12/1988 | Fujisaki |
| 4,799,156 A | 1/1989 | Shavit et al. |
| 4,823,264 A | 4/1989 | Deming |
| 4,823,265 A | 4/1989 | Nelson |
| 4,864,516 A | 9/1989 | Gaither et al. |
| 4,903,201 A | 2/1990 | Wagner |
| 4,914,698 A | 4/1990 | Chaum |
| 4,926,480 A | 5/1990 | Chaum |
| 4,932,042 A | 6/1990 | Baral |
| 4,941,170 A | 7/1990 | Herbst |
| 4,947,028 A | 8/1990 | Gorog |
| 4,947,430 A | 8/1990 | Chaum |
| 4,949,256 A | 8/1990 | Humble |
| 4,949,380 A | 8/1990 | Chaum |
| 4,960,981 A | 10/1990 | Benton |
| 4,970,681 A | 11/1990 | Bennett |
| 4,984,178 A | 1/1991 | Hemphill et al. |
| 4,989,238 A | 1/1991 | Iggulden et al. |
| 4,996,711 A | 2/1991 | Chaum |
| 5,025,373 A | 6/1991 | Keyser, Jr. et al. |
| 5,043,891 A | 8/1991 | Goldstein et al. |
| 5,063,507 A | 11/1991 | Lindsey et al. |
| 5,077,665 A | 12/1991 | Silverman et al. |
| 5,077,668 A | 12/1991 | Doi |
| 5,084,819 A | 1/1992 | Dewey et al. |
| 5,093,918 A | 3/1992 | Heyen et al. |
| 5,101,353 A | 3/1992 | Lupien et al. |
| 5,115,326 A | 5/1992 | Burgess et al. |
| 5,122,950 A | 6/1992 | Benton et al. |
| 5,136,501 A | 8/1992 | Silverman et al. |
| 5,146,488 A | 9/1992 | Okata et al. |
| 5,168,446 A | 12/1992 | Wiseman |
| 5,181,238 A | 1/1993 | Meddamana et al. |
| 5,193,110 A | 3/1993 | Jones et al. |
| 5,204,961 A | 4/1993 | Barlow |
| 5,205,200 A | 4/1993 | Wright |
| 5,220,501 A | 6/1993 | Lawlor et al. |
| 5,222,018 A | 6/1993 | Sharpe et al. |
| 5,222,234 A | 6/1993 | Wang et al. |
| 5,223,699 A | 6/1993 | Flynn et al. |
| 5,227,778 A | 7/1993 | Vacon et al. |
| 5,227,893 A | 7/1993 | Ett |
| 5,230,048 A | 7/1993 | Moy |
| 5,233,655 A | 8/1993 | Shapiro |
| 5,241,466 A | 8/1993 | Perry |
| 5,243,515 A | 9/1993 | Lee |
| 5,247,591 A | 9/1993 | Baran |
| 5,255,305 A | 10/1993 | Sattar |
| 5,258,908 A | 11/1993 | Hartheimer et al. |
| 5,263,167 A | 11/1993 | Conner, Jr. et al. |
| 5,265,033 A | 11/1993 | Vajk et al. |
| 5,276,628 A | 1/1994 | Schneiderhan |
| 5,280,422 A | 1/1994 | Moe et al. |
| 5,283,829 A | 2/1994 | Anderson |
| 5,291,554 A | 3/1994 | Morales |
| 5,295,068 A | 3/1994 | Nishino et al. |
| 5,295,181 A | 3/1994 | Kuo |
| 5,296,848 A | 3/1994 | Witheridge et al. |
| 5,297,027 A | 3/1994 | Morimoto et al. |
| 5,297,031 A | 3/1994 | Gutterman et al. |
| 5,297,032 A | 3/1994 | Trojan et al. |
| 5,299,123 A | 3/1994 | Wang et al. |
| 5,299,255 A | 3/1994 | Iwaki |
| 5,303,303 A | 4/1994 | White |
| 5,303,361 A | 4/1994 | Colwell et al. |
| 5,305,200 A | 4/1994 | Hartheimer et al. |
| 5,311,438 A | 5/1994 | Sellers et al. |
| 5,319,710 A | 6/1994 | Atalla et al. |
| 5,325,297 A | 6/1994 | Bird et al. |
| 5,329,589 A | 7/1994 | Fraser et al. |
| 5,339,156 A | 8/1994 | Ishii |
| 5,354,069 A | 10/1994 | Guttman et al. |
| 5,375,055 A | 12/1994 | Togher et al. |
| 5,384,703 A | 1/1995 | Withgott et al. |
| 5,394,324 A | 2/1995 | Clearwater |
| 5,414,773 A | 5/1995 | Handelman |
| 5,418,951 A | 5/1995 | Damashek |
| 5,420,926 A | 5/1995 | Low et al. |
| 5,424,938 A | 6/1995 | Wagner et al. |
| 5,426,281 A | 6/1995 | Abecassis |
| 5,426,594 A | 6/1995 | Wright et al. |
| 5,428,606 A | 6/1995 | Moskowitz |
| 5,432,841 A | 7/1995 | Rimer |
| 5,436,961 A | 7/1995 | Kobayashi |
| 5,446,759 A | 8/1995 | Campan, Jr. |
| 5,450,425 A | 9/1995 | Gunn et al. |
| 5,457,797 A | 10/1995 | Butterworth et al. |
| 5,465,206 A | 11/1995 | Hilt et al. |
| 5,467,390 A | 11/1995 | Brankley et al. |
| 5,485,510 A | 1/1996 | Colbert |
| 5,493,692 A | 2/1996 | Theimer et al. |
| 5,508,817 A | 4/1996 | Kunigami |
| 5,530,739 A | 6/1996 | Okada et al. |
| 5,537,586 A | 7/1996 | Amram et al. |
| 5,553,145 A | 9/1996 | Micali |
| 5,557,518 A | 9/1996 | Rosen |
| 5,557,728 A | 9/1996 | Garrett et al. |
| 5,559,721 A | 9/1996 | Ishii |
| 5,590,197 A | 12/1996 | Chen et al. |
| 5,598,557 A | 1/1997 | Doner et al. |
| 5,640,569 A | 6/1997 | Miller et al. |
| 5,649,186 A | 7/1997 | Ferguson |
| 5,650,761 A | 7/1997 | Gomm et al. |
| 5,657,389 A | 8/1997 | Houvener |
| 5,664,115 A | 9/1997 | Fraser |
| 5,671,280 A | 9/1997 | Rosen |
| 5,677,955 A | 10/1997 | Doggett et al. |
| 5,684,965 A | 11/1997 | Pickering |
| 5,689,652 A | 11/1997 | Lupien et al. |
| 5,694,546 A | 12/1997 | Reisman |
| 5,696,906 A | 12/1997 | Peters et al. |
| 5,699,528 A | 12/1997 | Hogan |
| 5,706,457 A | 1/1998 | Dwyer et al. |
| 5,710,889 A | 1/1998 | Clark et al. |
| 5,715,314 A | 2/1998 | Payne et al. |
| 5,715,399 A | 2/1998 | Bezos |
| 5,715,402 A | 2/1998 | Popolo |
| 5,717,989 A | 2/1998 | Tozzoli et al. |
| 5,724,424 A | 3/1998 | Gifford |
| 5,727,165 A | 3/1998 | Ordish et al. |
| 5,732,400 A | 3/1998 | Mandler et al. |
| 5,757,917 A | 5/1998 | Rose et al. |
| 5,761,648 A | 6/1998 | Golden et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,794,221 A | 8/1998 | Egendorf |
| 5,799,285 A | 8/1998 | Klingman |
| 5,803,500 A | 9/1998 | Mossberg |
| 5,818,914 A | 10/1998 | Fujisaki |
| 5,822,737 A | 10/1998 | Ogram |
| 5,826,241 A | 10/1998 | Stein et al. |
| 5,826,244 A | 10/1998 | Huberman |
| 5,845,265 A | 12/1998 | Woolston |
| 5,872,848 A | 2/1999 | Romney et al. |
| 5,873,069 A | 2/1999 | Reuhl et al. |
| 5,884,056 A | 3/1999 | Steele |
| 5,884,277 A | 3/1999 | Khosla |

(56) References Cited

U.S. PATENT DOCUMENTS

| | | |
|---|---|---|
| 5,890,138 A | 3/1999 | Godin et al. |
| 5,905,974 A | 5/1999 | Fraser et al. |
| 5,905,975 A | 5/1999 | Ausubel |
| 5,920,847 A | 7/1999 | Kolling |
| 5,922,074 A | 7/1999 | Richard et al. |
| 5,926,794 A | 7/1999 | Fethe |
| 5,963,917 A | 10/1999 | Ogram |
| 5,978,780 A | 11/1999 | Watson |
| 5,983,196 A | 11/1999 | Wendkos |
| 5,991,739 A | 11/1999 | Cupps et al. |
| 6,014,627 A | 1/2000 | Togher et al. |
| 6,014,634 A | 1/2000 | Scroggie et al. |
| 6,016,484 A | 1/2000 | Williams et al. |
| 6,018,722 A | 1/2000 | Ray et al. |
| 6,023,682 A | 2/2000 | Checchio |
| 6,029,150 A | 2/2000 | Kravitz |
| 6,032,133 A | 2/2000 | Hilt et al. |
| 6,035,288 A | 3/2000 | Solomon |
| 6,035,402 A | 3/2000 | Vaeth et al. |
| 6,044,363 A | 3/2000 | Mori et al. |
| 6,047,264 A | 4/2000 | Fisher et al. |
| 6,049,785 A | 4/2000 | Gifford |
| 6,052,670 A | 4/2000 | Johnson |
| 6,055,518 A | 4/2000 | Franklin et al. |
| 6,058,417 A | 5/2000 | Hess et al. |
| 6,061,448 A | 5/2000 | Smith et al. |
| 6,073,117 A | 6/2000 | Oyanagi et al. |
| 6,085,168 A * | 7/2000 | Mori ............... G06Q 20/00 705/17 |
| 6,085,176 A | 7/2000 | Woolston |
| 6,104,815 A | 8/2000 | Alcorn et al. |
| 6,119,137 A | 9/2000 | Smith et al. |
| 6,151,588 A | 11/2000 | Tozzoli et al. |
| 6,167,385 A | 12/2000 | Harley-Urquhart |
| 6,178,408 B1 | 1/2001 | Copple et al. |
| 6,192,407 B1 | 2/2001 | Smith et al. |
| 6,202,051 B1 | 3/2001 | Woolston |
| 6,216,115 B1 | 4/2001 | Barrameda |
| 6,233,565 B1 | 5/2001 | Lewis et al. |
| 6,234,525 B1 | 5/2001 | Schroder et al. |
| 6,243,691 B1 | 6/2001 | Fisher et al. |
| 6,246,996 B1 | 6/2001 | Stein et al. |
| 6,266,651 B1 | 7/2001 | Woolston |
| 6,324,525 B1 | 11/2001 | Kramer et al. |
| 6,347,307 B1 | 2/2002 | Sandhu et al. |
| 6,466,917 B1 | 10/2002 | Goyal et al. |
| 6,490,568 B1 * | 12/2002 | O'Mara ............... G06Q 20/10 705/38 |
| 6,529,885 B1 | 3/2003 | Johnson |
| 6,658,393 B1 | 12/2003 | Basch et al. |
| 6,810,383 B1 | 10/2004 | Loveland |
| 6,839,690 B1 | 1/2005 | Foth et al. |
| 6,996,539 B1 | 2/2006 | Wallman |
| 7,051,322 B2 | 5/2006 | Rioux |
| 7,072,864 B2 | 7/2006 | Brake, Jr. et al. |
| 7,096,192 B1 | 8/2006 | Pettitt |
| 7,099,838 B1 | 8/2006 | Gastineau et al. |
| 7,099,850 B1 | 8/2006 | Mann, II et al. |
| 7,110,971 B2 | 9/2006 | Wallman |
| 7,181,427 B1 | 2/2007 | DeFrancesco |
| 7,194,437 B1 | 3/2007 | Britto et al. |
| 7,249,055 B1 | 7/2007 | Elder |
| 7,305,362 B2 | 12/2007 | Weber et al. |
| 7,321,864 B1 | 1/2008 | Gendler |
| 7,333,953 B1 * | 2/2008 | Banaugh ............... G06Q 20/02 705/39 |
| 7,376,628 B2 | 5/2008 | Johnson |
| 7,395,236 B2 | 7/2008 | Degraaf et al. |
| 7,403,922 B1 | 7/2008 | Lewis et al. |
| 7,426,492 B1 | 9/2008 | Bishop et al. |
| 7,499,875 B1 | 3/2009 | May et al. |
| 7,567,928 B1 | 7/2009 | Oaten et al. |
| 7,617,128 B2 * | 11/2009 | Greak ............... G06Q 30/0609 705/26.35 |
| 7,644,019 B2 * | 1/2010 | Woda ............... G06Q 10/10 705/35 |
| 7,899,712 B2 | 3/2011 | May et al. |
| 8,255,325 B2 | 8/2012 | May et al. |
| 8,706,618 B2 | 4/2014 | Yu |
| 2001/0032144 A1 | 10/2001 | Magid |
| 2001/0032165 A1 | 10/2001 | Friend et al. |
| 2001/0032180 A1 * | 10/2001 | Takami ............... G06Q 20/10 705/39 |
| 2001/0041993 A1 | 11/2001 | Campbell |
| 2001/0047329 A1 | 11/2001 | Ashby |
| 2001/0049634 A1 | 12/2001 | Stewart |
| 2002/0013732 A1 | 1/2002 | Takata |
| 2002/0013767 A1 | 1/2002 | Katz |
| 2002/0023053 A1 * | 2/2002 | Szoc ............... G06Q 20/10 705/39 |
| 2002/0026398 A1 | 2/2002 | Sheth |
| 2002/0038277 A1 * | 3/2002 | Yuan ............... G06Q 30/0601 705/37 |
| 2002/0040344 A1 * | 4/2002 | Preiser ............... G06Q 20/102 705/42 |
| 2002/0078152 A1 | 6/2002 | Boone |
| 2002/0087460 A1 * | 7/2002 | Hornung ............... G06Q 40/02 705/38 |
| 2002/0087461 A1 | 7/2002 | Ganesan et al. |
| 2002/0095373 A1 | 7/2002 | Melchior et al. |
| 2002/0099655 A1 | 7/2002 | Melchior et al. |
| 2002/0111916 A1 * | 8/2002 | Coronna ............... G06Q 20/00 705/64 |
| 2002/0138406 A1 * | 9/2002 | Elgabry ............... G06Q 40/025 705/38 |
| 2002/0147656 A1 * | 10/2002 | Tam ............... G06Q 30/02 705/26.41 |
| 2002/0152133 A1 | 10/2002 | King et al. |
| 2002/0161707 A1 * | 10/2002 | Cole ............... G06Q 20/02 705/42 |
| 2002/0198750 A1 * | 12/2002 | Innes ............... G06Q 10/0635 705/7.28 |
| 2003/0033248 A1 | 2/2003 | Shimada |
| 2003/0050884 A1 | 3/2003 | Barnett |
| 2003/0120575 A1 | 6/2003 | Wallman et al. |
| 2003/0191709 A1 * | 10/2003 | Elston ............... G06Q 20/04 705/40 |
| 2003/0225678 A1 | 12/2003 | Understein |
| 2004/0019562 A1 * | 1/2004 | Viberg ............... G06Q 40/08 705/40 |
| 2004/0044620 A1 * | 3/2004 | Iversen ............... G06Q 20/10 705/40 |
| 2004/0054610 A1 | 3/2004 | Amstutz et al. |
| 2004/0064405 A1 | 4/2004 | Weichert et al. |
| 2004/0230522 A1 * | 11/2004 | Crosthwaite ............ G06Q 40/025 705/38 |
| 2004/0249741 A1 | 12/2004 | Understein |
| 2005/0159963 A1 * | 7/2005 | Gotschall ............... G06Q 50/167 705/316 |
| 2005/0251473 A1 | 11/2005 | Viviani |
| 2005/0289039 A1 * | 12/2005 | Greak ............... G06Q 30/0609 705/37 |
| 2006/0116957 A1 | 6/2006 | May et al. |
| 2006/0178972 A1 | 8/2006 | Jung |
| 2007/0073618 A1 | 3/2007 | Yu et al. |
| 2007/0136206 A1 * | 6/2007 | Kwok ............... G06Q 30/00 705/54 |
| 2009/0204523 A1 | 8/2009 | May et al. |
| 2012/0303522 A1 | 11/2012 | May et al. |
| 2012/0303532 A1 | 11/2012 | May et al. |

FOREIGN PATENT DOCUMENTS

| | | |
|---|---|---|
| EP | 1662418 A2 | 5/2006 |
| EP | 1679093 A1 | 7/2006 |
| EP | 1703406 A1 | 9/2006 |
| EP | 1705608 A1 | 9/2006 |
| JP | 10320646 | 12/1998 |
| WO | WO-9215174 A1 | 9/1992 |
| WO | WO-9634356 A1 | 10/1996 |
| WO | WO-9737315 A1 | 10/1997 |

(56) References Cited

FOREIGN PATENT DOCUMENTS

| WO | WO-9963461 A1 | 12/1999 |
|----|---------------|---------|
| WO | WO-0165338 A2 | 9/2001 |
| WO | WO-0171452 A2 | 9/2001 |
| WO | WO-0171452 A3 | 9/2001 |
| WO | WO-0182107 A1 | 11/2001 |
| WO | WO-0207059 A1 | 1/2002 |
| WO | WO-03010628 A2 | 2/2003 |
| WO | WO-03046692 A2 | 6/2003 |
| WO | WO-2006016250 A2 | 2/2006 |
| WO | WO-2006020110 A2 | 2/2006 |
| WO | WO-2006021033 A2 | 3/2006 |
| WO | WO-2006039364 A2 | 4/2006 |
| WO | WO-2006041899 A2 | 4/2006 |
| WO | WO-2006062995 A2 | 6/2006 |
| WO | WO-2006083752 A2 | 8/2006 |
| WO | WO-2006103428 A2 | 10/2006 |
| WO | WO-2007041103 A2 | 4/2007 |
| WO | WO-2007041103 A3 | 4/2007 |

OTHER PUBLICATIONS

"Alibaba.com Launches Online Payment Solution in China", PRNewswire, (Feb. 2, 2005), 1 p.
"U.S. Appl. No. 09/577,434, Advisory Action dated Mar. 18, 2002", 2 pgs.
"U.S. Appl. No. 09/577,434, Appeal Brief dated Feb. 28, 2006", 16 pgs.
"U.S. Appl. No. 09/577,434, Final Office Action dated Jun. 19, 2003", 12 pgs.
"U.S. Appl. No. 09/577,434, Final Office Action dated Jul. 14, 2004", 12 pgs.
"U.S. Appl. No. 09/577,434, Final Office Action dated Jul. 26, 2002", 11 pgs.
"U.S. Appl. No. 09/577,434, Final Office Action dated Aug. 15, 2005", 13 pgs.
"U.S. Appl. No. 09/577,434, Final Office Action dated Nov. 21, 2001", 12 pgs.
"U.S. Appl. No. 09/577,434, Non Final Office Action dated Apr. 12, 2002", 10 pgs.
"U.S. Appl. No. 09/577,434, Non Final Office Action dated Jun. 4, 2001", 10 pgs.
"U.S. Appl. No. 09/577,434, Non Final Office Action dated Dec. 18, 2002", 11 pgs.
"U.S. Appl. No. 09/577,434, Non-Final Office Action dated Jan. 20, 2004", 12 pgs.
"U.S. Appl. No. 09/577,434, Non-Final Office Action dated Feb. 25, 2008", 7 pgs.
"U.S. Appl. No. 09/577,434, Non-Final Office Action dated Dec. 20, 2004", 11 pgs.
"U.S. Appl. No. 09/577,434, Notice of Allowance dated Oct. 21, 2008", 5 pgs.
"U.S. Appl. No. 09/577,434, Pre-Appeal Brief Request filed Nov. 15, 2005", 5 pgs.
"U.S. Appl. No. 09/577,434, Reply Brief filed Aug. 24, 2006", 4 pgs.
"U.S. Appl. No. 09/577,434, Response filed Feb. 20, 2002 to Final Office Action dated Nov. 21, 2001", 11 pgs.
"U.S. Appl. No. 09/577,434, Response filed Mar. 18, 2003 to Non Final Office Action dated Dec. 18, 2002", 19 pgs.
"U.S. Appl. No. 09/577,434, Response filed Apr. 20, 2004 to Non-Final Office Action dated Jan. 20, 2004", 15 pgs.
"U.S. Appl. No. 09/577,434, Response filed Apr. 20, 2005 to Non-Final Office Action dated Dec. 20, 2004", 14 pgs.
"U.S. Appl. No. 09/577,434, Response filed May 8, 2008 to Non-Final Office Action dated Feb. 25, 2008", 14 pgs.
"U.S. Appl. No. 09/577,434, Response filed May 13, 2002 to Non Final Office Action dated Apr. 12, 2002", 23 pgs.
"U.S. Appl. No. 09/577,434, Response filed Sep. 4, 2001 to Non Final Office Action dated Jun. 4, 2001", 16 pgs.
"U.S. Appl. No. 09/577,434, Response filed Sep. 18, 2003 to Final Office Action dated Jun. 19, 2003", 15 pgs.
"U.S. Appl. No. 09/577,434, Response filed Sep. 26, 2002 to Final Office Action dated Jul. 26, 2002", 20 pgs.
"U.S. Appl. No. 09/577,434, Response filed Oct. 14, 2004 to Final Office Action dated Jun. 14, 2004", 16 pgs.
"U.S. Appl. No. 11/238,359, Final Office Action dated Jun. 26, 2008", 9 pgs.
"U.S. Appl. No. 11/238,359, Final Office Action dated Aug. 7, 2009", 21 pgs.
"U.S. Appl. No. 11/238,359, Final Office Action dated Aug. 17, 2010", 19 pgs.
"U.S. Appl. No. 11/238,359, Non-Final Office Action dated Feb. 5, 2010", 19 pgs.
"U.S. Appl. No. 11/238,359, Non-Final Office Action dated Feb. 6, 2009", 14 pgs.
"U.S. Appl. No. 11/238,359, Non-Final Office Action dated Feb. 28, 2008", 9 pgs.
"U.S. Appl. No. 11/238,359, Notice of Allowance dated Nov. 21, 2013", 18 pgs.
"U.S. Appl. No. 11/238,359, Response filed Apr. 30, 2008 to Non Final Office Action dated Feb. 28, 2008", 7 pgs.
"U.S. Appl. No. 11/238,359, Response filed May 1, 2009 to Non Final Office Action dated Feb. 6, 2009", 14 pgs.
"U.S. Appl. No. 11/238,359, Response filed Jun. 7, 2010 to Non Final Office Action dated Feb. 5, 2010", 13 pgs.
"U.S. Appl. No. 11/238,359, Response filed Aug. 26, 2008 to Final Office Action dated Jun. 26, 2008", 7 pgs.
"U.S. Appl. No. 11/238,359, Response filed Nov. 9, 2009 to Final Office Action dated Aug. 7, 2009", 18 pgs.
"U.S. Appl. No. 11/238,359, Response filed Nov. 17, 2010 to Final Office Action dated Aug. 17, 2010", 12 pgs.
"U.S. Appl. No. 11/332,068, Advisory Action dated Feb. 3, 2010", 3 pgs.
"U.S. Appl. No. 11/332,068, Examiner Interview Summary dated Apr. 3, 2009", 2 pgs.
"U.S. Appl. No. 11/332,068, Final Office Action dated Feb. 5, 2009", 15 pgs.
"U.S. Appl. No. 11/332,068, Final Office Action dated Nov. 13, 2009", 15 pgs.
"U.S. Appl. No. 11/332,068, Non-Final Office Action dated Jun. 10, 2010", 14 pgs.
"U.S. Appl. No. 11/332,068, Non-Final Office Action dated Aug. 19, 2008", 27 pgs.
"U.S. Appl. No. 11/332,068, Notice of Allowance dated Oct. 5, 2010", 4 pgs.
"U.S. Appl. No. 11/332,068, Response filed Jan. 13, 2010 to Final Office Action dated Nov. 13, 2009", 12 pgs.
"U.S. Appl. No. 11/332,068, Response filed Sep. 10, 2010 to Non Final Office Action dated Jun. 10, 2010", 15 pgs.
"U.S. Appl. No. 11/332,068, Response filed Nov. 19, 2008 to Non-Final Office Action dated Aug. 19, 2008", 11 pgs.
"U.S. Appl. No. 12/397,244, Non Final Office Action dated Sep. 19, 2011", 10 pgs.
"U.S. Appl. No. 12/397,244, Notice of Allowance dated Apr. 27, 2012", 8 pgs.
"U.S. Appl. No. 12/397,244, Response filed Feb. 20, 2012 to Non-Final Office Action dated Sep. 19, 2011", 15 pgs.
"U.S. Appl. No. 13/485,651, Appeal Brief filed Dec. 26, 2013", 14 pgs.
"U.S. Appl. No. 13/485,651, Final Office Action dated Apr. 26, 2013", 11 pgs.
"U.S. Appl. No. 13/485,651, Non Final Office Action dated Nov. 6, 2012", 11 pgs.
"U.S. Appl. No. 13/485,651, Preliminary Amendment filed Aug. 13, 2012", 3 pgs.
"U.S. Appl. No. 13/485,651, Response filed Feb. 6, 2013 to Non Final Office Action dated Nov. 6, 2012", 19 pgs.
"U.S. Appl. No. 13/485,651, Response filed Jun. 26, 2013 to Final Office Action dated Apr. 26, 2013", 10 pgs.
"U.S. Appl. No. 13/569,883, Appeal Brief filed Dec. 23, 2013", 27 pgs.

(56) References Cited

OTHER PUBLICATIONS

"U.S. Appl. No. 13/569,883, Final Office Action dated Apr. 26, 2013", 10 pgs.
"U.S. Appl. No. 13/569,883, Non Final Office Action dated Sep. 27, 2012", 10 pgs.
"U.S. Appl. No. 13/569,883, Response filed Jan. 28, 2013 to Non Final Office Action dated Sep. 27, 2012", 17 pgs.
"U.S. Appl. No. 13/569,883, Response filed Jun. 26, 2013 to Final Office Action dated Apr. 26, 2013", 14 pgs.
"Bidville, Inc. Partners With AuctionTamer Management Tools", Business Wire, (Nov. 17, 2004), 1 p.
"e Bay Launches the Most Comprehensive trust and safety upgrades to the World's largest person to person Trading site.", PR News, (Jan. 15, 1999).
"EZ2 Companies, Inc. Launches EZ2 Escrow website www.ez2escrow.com", Business Wire, (Mar. 31, 2005), 2 p.
"Feedback Overview and Feedback Forum", [Online]. Retrieved from the Internet: <URL: www.ebay.com>, (1999), 4 pages.
"German Application Serial No. 10195918.4, Office Action dated Apr. 12, 2006", with English translation of claims, 7 pgs.
"German Application Serial No. 10195918.4, Office Action dated Jun. 24, 2009", with English translation of claims, 13 pgs.
"German Application Serial No. 10195918.4, Office Action dated Sep. 12, 2007", with English translation of claims, 11 pgs.
"German Application Serial No. 10195918.4, Response filed Dec. 14, 2006 to Office Action dated Apr. 12, 2006", with English translation of claims, 16 pgs.
"German Application Serial No. 10195918.4, Response filed Dec. 23, 2008 to Office Action dated Sep. 12, 2007", with English translation of claims, 8 pgs.
"International Application Serial No. PCT/US01/08293, International Preliminary Examination Report dated Jul. 18, 2002", 5 pgs.
"International Application Serial No. PCT/US01/08293, International Search Report dated Sep. 10, 2001", 1 pg.
"International Application Serial No. PCT/US2006/037496, International Preliminary Report on Patentability dated Apr. 10, 2008", 5 pgs.
"International Application Serial No. PCT/US2006/037496, International Search Report dated Aug. 15, 2007", 2 pgs.
"International Application Serial No. PCT/US2006/037496, Written Opinion dated Aug. 15, 2007", 1 pg.
"Notes Users Get Custom CIS", LAN Magazine, (Mar. 1994), 18.
"Onsale Joins Fray as Online Shopping Picks up Speed: Internet Booms", Computer Reseller News, CMP Publications, Inc., USA, (Jun. 5, 1995), 1 pg.
"Onsale: Onsale Brings Thrill of Auctions and Bargain Hunting Online; Unique Internet retail service debuts with week-long charity auction for the Computer Museum in Boston", Business Wire, Dialog Web. 0489267 BW0022, (May 24, 1995), 3 pgs.
"The "Consumer-ization" of Business Data: Developments with Fortune and Wall Street Journal", Searcher, 3(3), (Mar. 1995), 23.
"The Check is in the E-mail", Information Today 12(3), (Mar. 1995), 43 pgs.
"United Kingdom Application Serial No. 0222072.1, Office Action dated Sep. 10, 2003", 2 pgs.
"United Kingdom Application Serial No. 0222072.1, Response filed Jul. 30, 2004 to Office Action dated May 24, 2004", 8 pgs.
Baumann, G. W, "Personal Optimized Decision/Transaction Program", IBM Technical Disclosure Bulletin, (Jan. 1995), 83-84.
Billpoint, "Billpoint Index Page", www.billpoint.com, Billpoint, Inc., (Jan. 25, 1999), 2 pages.
Business Wire, "Mediappraise Receives National Award for Web-based Technology That Enables Companies to Solve Thorny HR Problem", Business Wire, (Dec. 14, 1998), 1-2.
Clark, Don, "Microsoft, Visa to Jointly Develop PC Electronic-Shopping Software", The Wall Street Journal, p. B7 (W) p. B9 (E) col. 1, (Nov. 9, 1994), p. B7 (W) p. B9 (E) col. 1.
Clemons, E., "Evaluating the prospects for alternative electronic securities", Proceedings of ICIS 91: 12th International Conference on Information Systems, (Dec. 16-18, 1991), 53-63.

Day, Jacqueline, "Industry Players in Hot Pursuit of Secure Internet Transaction Mode", Bank Systems & Technology v32 n1, (Jan. 6, 1995), 1 pg.
Gaffin, Adam, "Aversion Therapy: Banks Overcoming Fear of the "net"", Network World, v11 n50, (Dec. 12, 1994), 1 pg.
Goldberg, Lee, "Prototype E-mail System Includes Multimedia, Intelligent Retrieval", Electronic Design, (Apr. 4, 1994), 9-10.
Graham, Ian, "The Emergence of Linked Fish Markets in Europe", Electronic Markets. vol. 8, No. 2, (1998), 29-32.
Hane, Paula J., "NewsEdge Forges Alliances with Content", Information Today, (Oct. 1, 1998), 12-14.
Hauser, R., "Anonymous Delivery of Goods in Electronic Commerce", IBM Technical Disclosure Bulletin, 39(3), (Mar. 1996), 363-366.
Hess, C. M, et al., "Computerized Loan Organization System: An Industry Case Study of the Electronic Markets Hypothesis", MIS Quarterly, vol. 18(3), (Sep. 1994), 251-275.
Jaskiewicz, Stanley, "Bidding Auctioneers: Negotiating an Agreement: Many unpublicized deals are available to fiduciaries in chargeof consignment agreements for high caliber merchandise", Trusts & Estates. 130,6, (Jun. 1991), 2 pgs.
Kaiser, L. F, et al., "The Official eBay Guide to Buying, Selling and Collecting Just About Anything", Simon and Schuster, (Nov. 16, 1999), p. 31-35, 108-109, 133.
Klein, Stefan, "Introduction to Electronic Auctions", EM—Electronic Auctions. EM Electronic Markets, vol. 7, No. 4, (Dec. 1997), 3-6.
Knowles, Anne, "Improved Internet Security Enabling On-line Commerce", PC Week, 12(11), (Mar. 20, 1995), 2 pages.
Krol, Ed, "The Whole Internet User's Guide & Catalog", (1994), 101-148.
Lang, Curtis, "Cashing in: The Rush is on to Buy and Sell on the Internet", Advertising Age, (Dec. 19, 1994), 11-12.
Lee, H. G, "Electronic brokerage and electronic auction: the impact of IT on market structures", Proceedings of the Twenty-Ninth Hawaii International Conference on System Sciences, vol. 4, (1996), 397-406.
Lee, Ho Geun, "AUCNET: Electronic Intermediary for Used-Car Transactions", Focus Theme, Electronic Markets, vol. 7, No. 4, (1997), 24-28.
Malone, T., et al., "Electronic Markets and Electronic Hierarchies", Communications of the ACM, vol. 30, No. 6, (Jun. 1987), 484-497.
Mardesich, Jodi, "Site Offers Clearance for End-of-Life Products—Onsale Takes Auction Gavel Electronic", Computer Reseller News, (Jul. 8, 1996), 2 pps.
Massimb, Marcel, "Electronic Trading, Market Structure and Liquidity", Financial Analysts Journal, 50(1), (Jan./Feb. 1994), 39-50.
Meade, J., "Visual 360: A Performance Appraisal System That's 'Fun'", HR Magazine, Society for Human Resource Management., (Jul. 1999), 3 pgs.
Meyerowitz, Robin, "Foresight Set to Introduce FastPace Instant Contact", MacWeek, (Jul. 25, 1994), 2-3.
Nash, Jim, "Beyond Mail Software Steps Beyond Completition", Computerworld, (Aug. 19, 1991), 7-8.
Neal, David, "E-shoppers gain protection", IT Week, 7(11), (Mar. 22, 2004), 25.
Neo, B. S, "The implementation of an electronic market for pig trading in Singapore", Journal of Strategic Information Systems; vol. 1(5), (Dec. 1992), 278-288.
Pinker, E. J, et al., "The Design of Online Auctions: Business Issues and Current Research", Computers and Information Working Paper No. CIS 01-05, [Online]. Retrieved from the Internet: <URL: http://papers.ssrn.com/sol3/papers.cfm?abstract_id=296253>, (2001), 42 pgs.
Post, D. L, et al., "Application of auctions as a pricing mechanism for the interchange of electric power", IEEE Transactions on Power Systems, 10(3), (Aug. 1995), 1580-1584.
Preist, Chris, et al., "Adaptive Agents in a Persistent Shout Double Auction", International Conference on Information and Computation Economies, Proceedings of the first international conference on Information and computation economies, (1998), 11-18.
Quint, Barbara, "Newspapers Reborn in Electronic Information Age", Searcher, (Jun. 1993), 21-24.

(56) References Cited

OTHER PUBLICATIONS

Reck, M., "Formally Specifying an Automated Trade Execution System", The Journal of Systems and Software, 1993, Elsevier Science Publishing, USA, (1993), 245-252.

Reck, Martin, "Trading-Process Characteristics of Electronic Auctions", Focus Theme, vol. 7, No. 4, (1997), 17-23.

Resnick, Paul, "Reputation systems", Communications of the ACM, 43(12), (Dec. 2000), 45-48.

Rizzo, John, "And E-mail for All: E-mail Software and Gateway Software Packages of Creating a Cross-Platform E-mail System", MacUser, (Jul. 1994), 4-6.

Rockoff, T. E, et al., "Design of an Internet-based system for remote Dutch auctions", Internet Research: Electronic Networking Applications and Policy, vol. 5(4), (Jan. 1, 1995), 10-16.

Scheier, Robert L., "PDAs Spell Sea Change for the PC Industry", PC Week, (Nov. 16, 1992), 15-18.

Schmid, B. F, "The Development of Electronic Commerce", EM—Electronic Markets, No. 910, (Oct. 1993), 2 pgs.

Siegmann, Ken, "Nowhere to go but up", PC Week; vol. 12(42), Ziff-Davis Publishing Company, (Oct. 23, 1995), 1-3.

Smith, Tom, "Faxing Lets Daily Papers Provide Up-to-the-minute "Zoned" News", Network World, (Feb. 26, 1990), 44-45.

Teinowitz, Ira, "Just the Fax, Ma'am Latest Newspaper Refrain", Advertising Age, (Apr. 26, 1993), 25-27.

Tessler, J., "eBay's Deal with Wells Fargo Allows Sellers to Accept Credit", Press Release, (Mar. 2, 2000).

Thomas, Brian, "Internet for Scientists & Engineers: Online Tools and Resources", SPIE Optical Engineering Press, (1995), 57-70.

Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.

Turban, Efraim, "Auctions and Bidding on the Internet: An Assessment", Focus Theme, EM—Electronic Markets, vol. 7, No. 4, (1997), 7-11.

Van Heck, E., et al., "Experiences with Electronic Auctions in the Dutch Flower Industry", Focus Theme, Erasmus University, the Netherlands, (1996), 6 pgs.

Walley, Wayne, "Wayne Walley Publishes Media Works", Advertising Age, (Jan. 14, 1991), 36-37.

Warbelow, A, et al., "Aucnet: TV Auction Network System", Harvard Business School Case/Study, HBVR#9-190-001, USA, (Jul. 1989), 1-16.

Zwass, V., "Electronic Commerce: Structures and Issues", International Journal of Electronic Commerce, Fall 1996, vol. 1, No. 1, (Fall 1996), 3-23.

* cited by examiner

RELEASE OF FUNDS BASED ON CRITERIA

RELATED APPLICATION

This application is a continuation of and claims the benefit of priority under to U.S. patent application Ser. No. 11/238,359, filed on Sep. 29, 2005 which is hereby incorporated by reference herein in its entirety.

FIELD

The disclosed subject matter relates generally to the technical field of data processing and, in one example embodiment, to a method and system of releasing funds associated with a network-based commerce transaction based on criteria.

BACKGROUND

For users of a network-based commerce transaction, a reliable and convenient payment mechanism is particularly important for enhancing user trust in the transaction facility. A typical network-based transaction facility, however, does not ensure the expedient and secure completion of payment transactions. For network-based commerce transactions, often the seller is directly paid by the buyer. This is risky for buyers because the buyers may receive a defective product, a misrepresented product, or not receive the product at all. Further, disreputable sellers may not be motivated to resolve any dispute because they have already received funds.

For some markets, buyers and sellers may instead agree to use an escrow account for the buyer to deposit funds. The buyer may instruct the escrow holder to release the funds to the seller upon satisfactory receipt of the item. However, the seller may wait a prohibitively long time to receive funds, that is, until the buyer receives the item and approves of funds release.

Accordingly, current payment transactions may delay payments to sellers and delivery of purchased goods to buyers.

SUMMARY

According to one embodiment, a system and a method to transfer payment to a seller of a network-based commerce transaction are described herein. The method includes generating a risk model based on seller-specific criteria, and releasing funds from a holding account to the seller based on the risk model.

Other features will be apparent from the accompanying drawings and from the detailed description that follows.

BRIEF DESCRIPTION OF THE DRAWINGS

Embodiments of the present invention are illustrated by way of example and not limitation in the Figures of the accompanying drawings, in which like references indicate similar elements and in which.

DETAILED DESCRIPTION

Embodiments describe a method and a system to transfer payment to a seller of a network-based commerce transaction. The method includes generating a risk model based on seller-specific criteria, and releasing funds from a holding account to the seller based on the risk model.

In the following description, for purposes of explanation, numerous specific details are set forth in order to provide a thorough understanding of embodiments of the present invention. It will be evident, however, to one skilled in the art that embodiments of the present invention may be practiced without these specific details.

Platform Architecture

Figure 1:
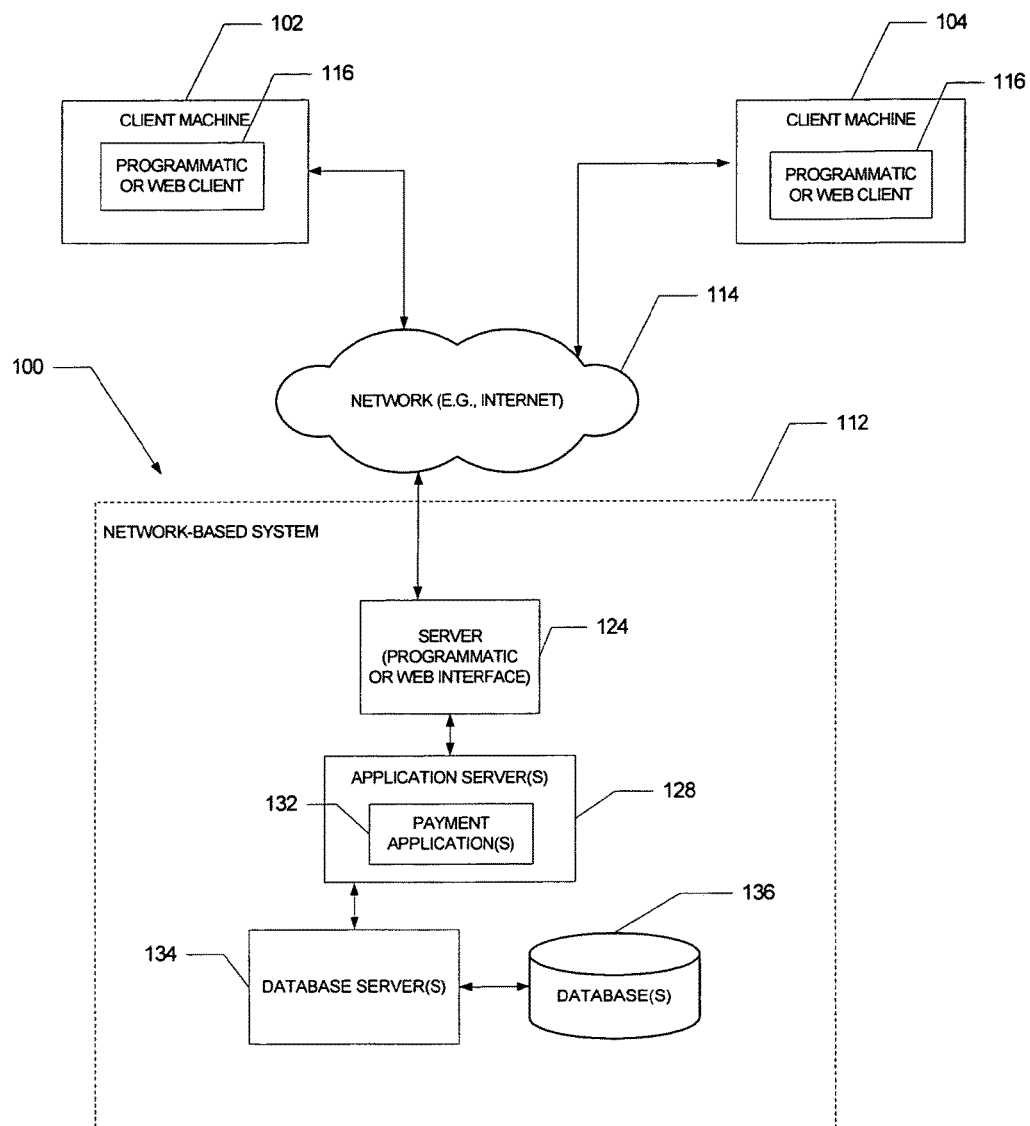
FIG. 1 illustrates a network diagram depicting a system, according to an example embodiment of the present invention, having a client-server architecture.

FIG. 1 illustrates a network diagram depicting a system 100 having a client-server architecture, according to an example embodiment of the present invention. The system 100 includes a client machine 102, such as a buyer's machine, a client machine 104, such as a seller's machine, and a network-based system 112, such as a network-based commerce system, coupled by a network 114. A system, in the example form of the network-based system 112, provides server-side functionality, via the network 114 to one or more clients.

The network 114 may, for example, be the Internet, a public or private telephone network (wireline or wireless), a private wireless network using technologies such as Bluetooth or IEEE 802.11x or other networks. The network 114 may include a mobile telephone network, a wireless wide area network (WWAN), a wireline telephone network, a wireless local area network (wireless LAN or WLAN), a wireless Metropolitan Area Network (MAN), and/or a wireless personal area network (PAN) (e.g., a Bluetooth® network). Other network-based technologies that may be used to connect include PON, VSAT satellite, Micro-impulse Radar, Radio Frequency identification (RFID), UltraWide Band, and/or Infrared. The network-based device may connect to the web using mobile internet exchange, e.g. Wireless Application Protocol (WAP) and/or Hypertext Transport Protocol (HTTP).

The client machines 102, 104 may include any network-based device, such as a mobile device, a palmtop computer, a laptop computer, a desktop computer, a personal digital assistant, a cellular telephone, a communications device, a wireless telephone, a land-line telephone, a control system, a camera, a scanner, a television, television cable, a telephone with a web browser, a facsimile machine, a printer, a pager, and/or a personal trusted device. The device may be browser-enabled.

FIG. 1 further illustrates, for example, a client 116 (e.g., a web client such as a web browser, Internet Explorer® browser developed by Microsoft®, and/or a programmatic client) that may execute on the client machine 102, 104.

Turning specifically to the network-based system 112, a server 124, such as a Application Program Interface (API)

server, a Short Messaging Service (SMS) Gateway Server, a web server, or an Interactive Voice Response (IVR) server may be coupled to, and may provide programmatic, SMS, web, and IVR interfaces, respectively, to one or more application servers 128. The machines 102, 104 may use one or more of these interfaces to access the application server(s) 128.

Further, while the system 100 shown in FIG. 1 employs a client-server architecture, embodiments are of course not limited to such an architecture, and could equally well find applications in a distributed, or peer-to-peer, architecture system.

The application server(s) 128 may host one or more payment application(s) 132. The application server(s) 128 are, in turn, shown to be coupled to one or more database servers 134 that facilitate access to one or more databases 136.

The payment application(s) 132 may provide a number of payment services and functions to users, such as client users, for example: vendors or sellers and buyers. The payment application(s) 132 may allow users to accumulate value (e.g., in a commercial currency, such as the U.S. dollar, or a proprietary currency, such as "points") in accounts, and then later to redeem the accumulated value for an offer (e.g., goods, services, promotions, or donation opportunities). The payment applications may also extend credit to user, and/or may also have access to other funding sources to complete transactions—e.g. a credit card, a bank account, and/or a credit line. A financial service provider may operate as a money transmitter or a bank, for instance, and may operate using the payment application(s) 132.

The payment application(s) 132 may have an infrastructure to pay a plurality of vendors for a plurality of transactions each day. The payment application(s) 132 may also be implemented as a standalone software program, which does not necessarily have networking capabilities.

Figure 5:
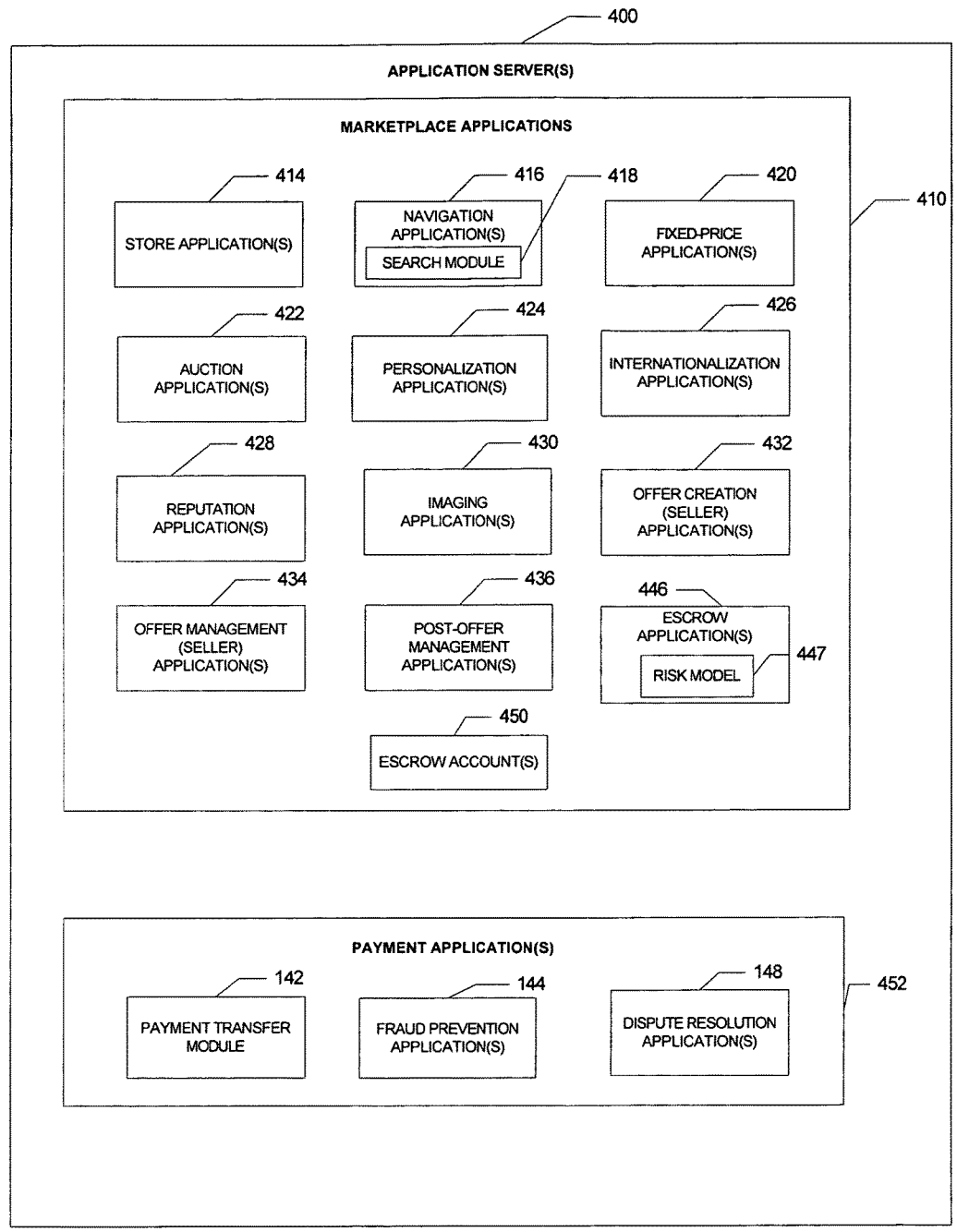
FIG. 5 illustrates a block diagram showing an application server in an example embodiment of the present invention.

The payment application(s) 132 may have access to the database 136 having, for example, the personal user account information through, for example, the database server(s) 134. The user account information may include payment information associated with the seller and a shipping address of the buyer, for example. The programmatic or web client 116 may operate a program supported by the one or more database server(s) 34. The database server(s) 134 may support one or more account information links on a user interface of the machine 102 or 104, for example, using the client 116. By accessing the database server(s) 134, the client user may add, amend or delete account information of the client user, among other information. One of the default payment methods may include direct transfers from system account balances, internal credit, a gift certificate, a bank account, a debit card, buyer credit, and/or a credit card into a holding account 150 of the payment application(s) 132, as shown in FIG. 2 or into an escrow account 450 of the payment application(s) 452, as shown in FIG. 5.

Application Server(s)

Figure 2:
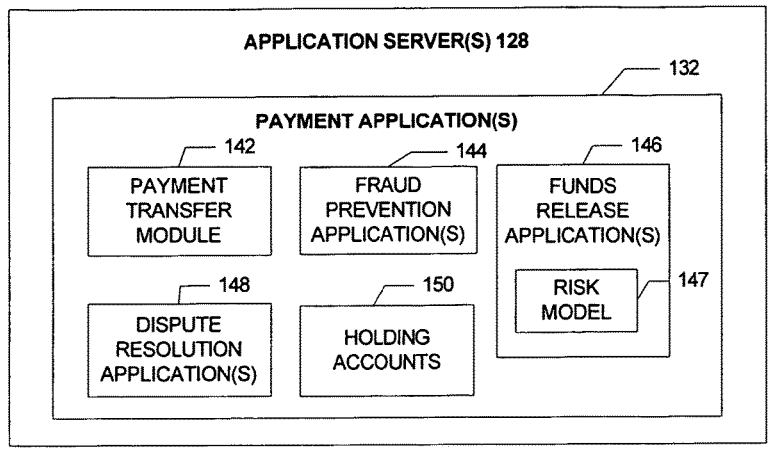
FIG. 2 illustrates a block diagram showing an application server in an example embodiment of the present invention.

FIG. 2 illustrates a block diagram showing application server(s) that are part of the network-based system 112, in an example embodiment of the present invention. In this embodiment, the payment application(s) 132 may be hosted by the application server(s) 128 of the network-based system 112.

The payment application(s) 132 may include a payment transfer module 142, fraud prevention application(s) 144, funds release application(s) 146 (such as a funds release module), dispute resolution application(s) 148, and/or holding account(s) 150.

The payment transfer module 142 may be responsible for executing payment transactions in transferring a payment from the buyer (e.g., buyer account) to the seller (e.g., seller account) via the payment application(s) and/or the financial service provider. The payment may be automatically transferred directly or may transfer through one of the holding accounts 150 between parties of the commerce transaction.

The payment application(s) 132 receives information from the transaction facility, stores some or all of this information for historical purposes in the database 136, and determines what information to pass to the fraud prevention application(s) 144 and the funds release application(s) 146. The fraud prevention application(s) 144 and the funds release application(s) 146 may each utilize this information to determine a risk level involved in the payment transaction. In one embodiment, input from one or more third party risk analysis providers (e.g., credit rating agencies) may be used to evaluate the risk level of the payment transaction. The results of the evaluation are passed back to the funds release application(s) 146 and/or the fraud prevention application(s) 144, which continue processing the payment transaction based on the evaluation results.

The fraud prevention application(s) 144 may implement various fraud detection and prevention mechanisms to reduce the occurrence of fraud within the system 112. The fraud prevention application(s) may prevent fraud with respect to the third party and/or the client user in relation to any part of the request, payment, information flows and/or request fulfillment. Fraud may occur with respect to unauthorized use of financial instruments, non-delivery of goods, and abuse of personal information. The fraud prevention application(s) 144 may also work closely with (and/or similarly to) the funds release application(s) 146, and vice versa.

The funds release application(s) 146 may include a risk model 147. The risk model 147 may be generated using data from the database(s) 136, which may include data tables 200 of FIG. 3. The data tables 200 of FIG. 3 may include a transaction-specific table 210, a buyer-specific table 220, and/or the seller-specific table 230 to track data regarding the transaction, data regarding the buyer, and data regarding the seller, respectively.

The risk model 147 may evaluate the accumulated data at various stages of the payment transaction to assess potential involved risks. The involved risks may concern, for example, a likelihood that a seller may be fraudulent (e.g., a seller lists goods for sale online with no intent or ability to deliver the purchased goods), or a seller's ability to fulfill purchase orders promptly. Based on the risk evaluation, the payment application(s) 132 may restrict a payment transaction between a buyer and a seller. In one embodiment, the risk evaluation is performed in real time and may enable an uninterrupted processing of the payment transaction.

Based on the information received from various sources, the risk model 147 may determine the risk level of the payment transaction using a scoring algorithm. It should be noted that any scoring algorithm known in the art may be used by the risk model 147 without loss of generality. The risk model 147 may produce a consolidated risk response and passes it to the payment transfer module 142. The risk response may include, for example, information indicating that service should be denied to a participant due to high likelihood of fraud, information on a recommended service fee for processing the payment transaction, information on recommended restrictions on payment instruments to be used by either the buyer or the seller, and/or information on recommended restrictions on disbursing funds to the seller.

The payment transfer module 142 receives the risk response and acts according to the information provided. That is, the payment transfer module 142 may reject the payment transaction (or deny service to either the buyer or the seller entirely), process the payment transaction without any changes, or restrict (timing, and/or amount) the payment or manner in which the payment transaction is conducted. For example, the payment transfer module 142 may limit payment instruments offered for use in the payment transaction, may assign or modify a fee for processing the payment transaction, or may restrict the time, amount, or the manner in which funds are disbursed to the seller.

The amount of funds released from the holding account 150 (or the escrow account 450) may vary according to the risk model assessment. The funds may be released from the holding account 150 (or the escrow account 450) to the seller based on the assessment by the risk model 147. For example, 95% of the funds may be released within or at 30 days. In another example, a certain percentage of a seller's average monthly transactions may be released immediately.

In addition, or alternatively, the timing for release of the funds from the holding account 150 (or the escrow account 450) may vary according to the risk model assessment. For example, the funds may be released at a time, e.g. 0 days, 15 days, or 30 days, after the funds are received into the account 150 (or 450). The funds release may be partial or full at the specified time, depending upon the circumstances or specifications of the funds release application(s). The release of the funds to the seller may thus be completed in a plurality of stages over a period of time, wherein the plurality of stages and the period of time is determined by the risk model assessment. For example, half of the funds may be released at 0 days, 25% may be released at 15 days, and the remaining percentage may be released at 30 days.

The funds release application(s) 146 may continuously (or on a periodic basis) trace transactions, e.g., a seller's transactions on a daily basis, and therefore the variable time or variable amount release may dynamically change. For instance, if the seller has a substantially large increase in velocity of trade and thus has a large amount of funds held in a holding account, funds may be released much more quickly.

In an additional embodiment, the seller may have given the payment application(s) 132 assurances, such as a security proxy or collateral, in exchange for minimizing the amount of funds held and/or for minimizing the time the funds are held. For example, if the seller has given the payment application(s) a valid social security number, financial services provider account information (e.g., bank account number, credit card account number, PayPal account access), a large amount of cash or some other proxy of security, the amount of time and amount of funds held may be minimized for that seller. The security proxy may also be considered a factor in the risk model 147 of the funds release application(s).

In one embodiment, the payment application(s) 132 may charge fees that vary according to the risk model assessment for each seller. For example, the fees may be reduced for more "trusted" sellers. In an additional embodiment, the seller may be considered a top tier seller in the network-based commerce system (e.g. an eBay® PowerSeller™) and/or in the payment application(s). This top tier status may result in paying lower fees of the payment application(s), and/or in having quicker access to funds in holding accounts. This top tier status may be dynamic and may also depend on other factors, such as those factors considered by the risk model 147.

From a system point of view, the risk model 147 may aid in controlling risk exposure associated with the payment application(s) 132. For example, the risk model 147 evaluates the risk that the buyer will not receive the item paid for, or will receive an unacceptable item, and that the seller will have an unsatisfactory response. In this instance, if the seller is not able to reimburse the buyer (or the payment application(s)), or refuses to make the reimbursement, the payment application(s) may then reimburse the buyer, thus affecting the risk exposure associated with the payment application(s). In this embodiment, the buyer is assured of "safe payments." In alternate embodiments, the buyer may absorb the risk.

The dispute resolution application(s) 148 may provide mechanisms whereby disputes arising between transacting parties may be resolved. For example, the dispute resolution applications 148 may provide guided procedures whereby the parties are guided through a number of steps in an attempt to settle a dispute. In the event that the dispute cannot be settled via the guided procedures, the dispute may be escalated to a mediator or arbitrator. In an event where the seller and buyer do not come to an agreement and the buyer never received the item, or received a defective item, the payment application(s) may reimburse the buyer. If the funds in the holding account 150 have not yet been released to the seller, the funds in the account may be given back to the buyer.

The holding account 150 may be a transaction-specific holding account, and/or the holding account 150 may be a general seller-specific holding account associated with pending seller transactions, with or without sub-accounts for specific transactions. In any instance, the seller may associate collateral with the holding account directly or through another seller account associated with the payment application(s).

Data Structures

Figure 3:
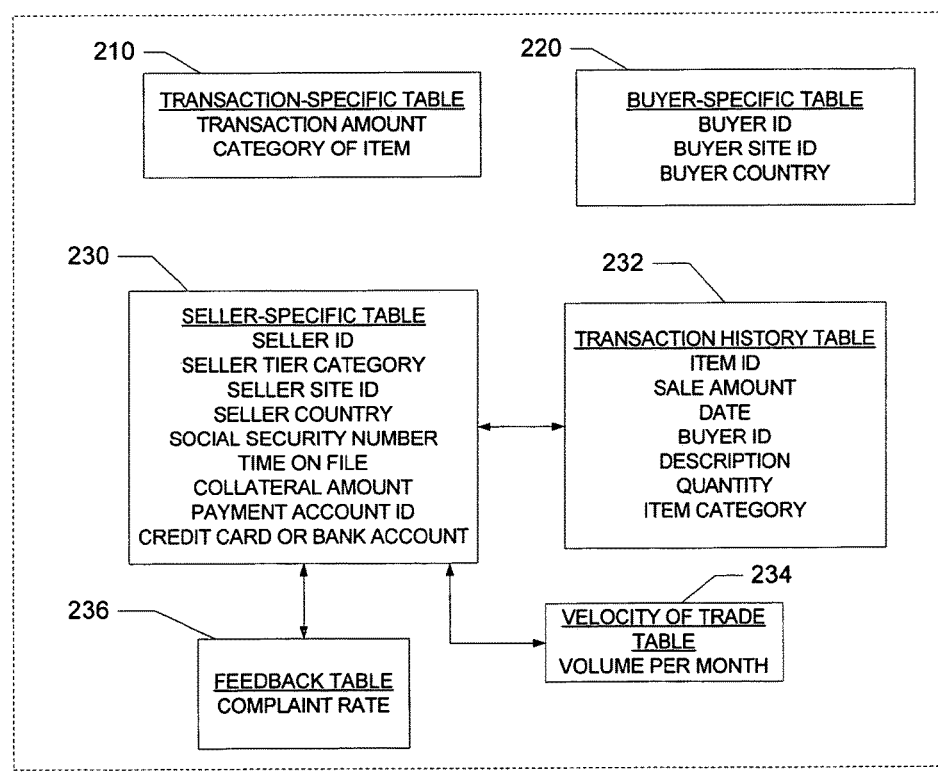
FIG. 3 illustrates a high-level entity-relationship diagram, illustrating various tables that may be maintained within one or more databases, according to an example embodiment.

FIG. 3 illustrates a high-level entity-relationship diagram, illustrating various tables 200 that may be maintained within the database(s) 136 according to an example embodiment. The tables 200 may be utilized by and support the application(s) of the application server(s). The database(s) 136 may, in one embodiment, be implemented as a relational database, and includes a number of tables having entries, or records, that are linked by indices and keys. In an alternative embodiment, the database(s) 136 may be implemented as collection of objects in an object-oriented database.

The tables 200 may include a transaction-specific table 210, a buyer-specific table 220, and a seller-specific table 230. The transaction-specific table 210, the buyer-specific table 220, and the seller-specific table 230 may each include a record for each transaction, each buyer, and each seller, respectively, of the network-based system 112. A user may, it will be appreciated, operate as a seller, a buyer, or both, within the network-based system 112.

The transaction-specific table 210 may include a record for the specific transaction (e.g., a purchase transaction) under consideration in the risk model 147. The transaction-specific table 210 may include information such as the buyer, the seller, the description of the item, the price paid, the date, the quantity sold, the item identification number, the item category, and other transaction-related information.

The buyer-specific table 220 may include the buyer identification number, the buyer site identification, such as the IP address of the associated machine, the buyer country, and other buyer-related information.

The seller-specific table 230 may include the seller identification number, the seller site identification, such as the IP address of the associated machine, the seller country, the seller tier category, a tenure time associated with the network-based commerce system, security proxy, such as collateral associated with the holding account from the seller, a social security number of the seller, or a financial services provider account number of the seller, and other seller-related information, such as consistent volume sales, a high percentage total positive feedback for a minimum number of ratings, network-based marketplace policy compliance, a payment application account in good financial standing, and averaging a minimum monetary amount in sales per month for a minimum number of consecutive months.

The seller-specific table 230 may further be associated with a transaction history table 232 of the seller, a feedback table 236 of the seller, and a velocity of trade table 234 of the seller. The transaction history table 232 may include an item identification number, a sale amount, a date, a buyer identification number, a description, a quantity sold, and an item category for each transaction with which the seller is associated. The feedback table 236 may include peer review and a complaint rate related to the seller for various network-based transactions. The velocity of trade table 234 may include a volume of trade per month for items that the seller sells on the network-based commerce system.

Interaction/Flowchart

Figure 4:
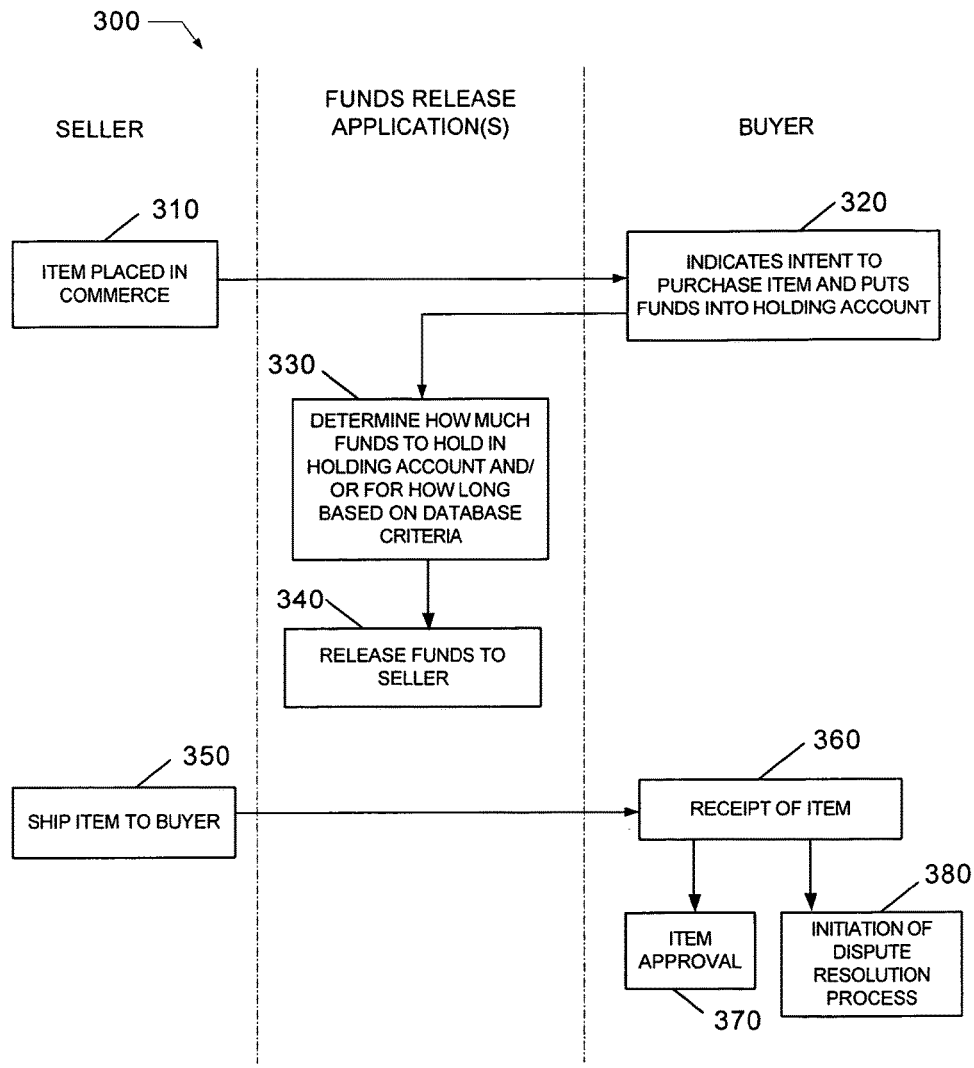
FIG. 4 illustrates an interaction/flow chart according to an example embodiment.

FIG. 4 illustrates an interaction/flow chart of a method 300, according to an example embodiment of the present invention. The interaction chart is divided into several categories, including the seller, the funds release application(s) 146, and the buyer, representing actions taken by or at that user or application.

At block 310, seller places an item in commerce. The item may be placed in the network-based system 112 for sale. The item may be offered for sale in an auction sale, or may be offered for sale at a fixed-price.

At block 320, the buyer indicates intent to purchase the item placed in commerce. The item may have been won in the auction or the buyer may have indicated, in another way, intent to purchase the item offered at the fixed-price. The buyer may then transfer funds into the holding account 150.

At block 330, the funds release application(s) determines the amount of funds to hold back from the seller in the holding account, and/or determines for how long to hold back the funds, based on the risk model assessment using the criteria gathered from the database.

At block 340, funds from the holding (or escrow) account are released to the seller by the payment transfer module 142 per the assessment from the risk model 147 of the funds release application(s) 146.

At block 350, the item is sent to the buyer at the direction of the seller. The item may be sent after or before funds are released to the seller or even during funds release.

At block 360, the buyer receives the item sent at block 350.

At block 370, the buyer approves the item received at block 360 and the transaction is completed. It will be appreciated that the funds may or may not have been released to the seller before buyer approval. However, upon buyer approval, the funds may be released, if not done so already.

At block 380, alternative to block 370, the buyer initiates the dispute resolution process, for example, when the buyer does not approve of the item (e.g., the item is not as described, or is defective), or if the buyer does not receive the item. The dispute resolution process may start with a simple communication to the seller of the issue. The buyer and seller may use the dispute resolution application(s) 148 to resolve the issue.

Another Embodiment of an Application Server(s)

FIG. 5 illustrates a block diagram showing application server(s) 400 in an example embodiment of the present invention. The application server(s) 400 may replace the application server(s) 128 of the network-based system 112 of FIG. 1 in certain environments. In this embodiment, the application server(s) 400 may host one or more marketplace application(s) 410, and one or more payment application(s) 452 (similar to payment application(s) 132, except application(s) 452 has an escrow account 450 rather than a holding account 150).

The buyer may "shop" or search, using one or more marketplace application(s) 410, for an offer associated with the seller. The marketplace application(s) 410 may provide a number of marketplace functions and services to buyers, sellers, and/or to third parties, who access the system 112. The marketplace applications 410 may provide a number of offering mechanisms and price-setting mechanisms; whereby a seller may list goods or services for sale, a promotion or a donation opportunity, a seller may promote their offers, a buyer can express interest in or indicate a desire to purchase such goods or services or to donate, and a price can be set for a transaction pertaining to the goods or services, or donation opportunity.

The marketplace applications 410 may include one or more store applications 414. In an embodiment, the store applications 414 allow sellers to group their offers within a virtual store, which may be otherwise personalized by and for the sellers. Such a store may also offer promotions, incentives and features that are specific to and personalized by the respective seller.

Navigation of the network-based system 112, including through the store application(s) 414, may be facilitated by one or more navigation applications 416. The one or more navigation application(s) may include a search module 418. The navigation application(s) may enable key word searches of products/services/promotions/donations published via the system 112. A browse application allows users to browse various category (e.g. music, books, offer price, shipping price), catalogue, or inventory data structures according to which products/services/promotions/donation may be classified within the system 112. Various other navigation applications may be provided to supplement the search and browsing applications.

The marketplace applications 410 may include one or more fixed-price application(s) 420. The fixed-price applications 420 support fixed-price offer formats and buyout-type offers. The fixed-price offer format may include, for example, the traditional classified advertisement-type offer, a catalogue offer, a television advertisement offer, a magazine offer, a website offer, an SMS offer, a data services offer, a billboard offer, a banner ad offer, or any other type of virtual or physical marketplace medium. The fixed-price offer in any of these listed formats may be considered the point of sale. In an additional embodiment, the client user may use the navigation application(s) to find the fixed-price offer.

In an embodiment, buyout-type offers (e.g., including the Buy-It-Now (BIN) technology developed by eBay Inc., of San Jose, Calif.) may be offered in conjunction with an auction-format offer. The buyout-type offer may allow a buyer to purchase goods or services or make a donation, which are also being offered for sale via an auction, for a fixed-price that may be higher than the starting price of the auction. The buyout-type offer in any of these listed formats may be published in any virtual or physical marketplace medium and may be considered the point of sale. The offer may be accepted by the client user by indicating consent to the offer. In an additional embodiment, the client user may use the navigation application(s) to find the buyout-type offer.

The marketplace applications 410 may include one or more auction applications 422 that support various auction-format offer and price setting mechanisms (e.g., English, Dutch, Vickrey, Chinese, Double, Reverse auctions, etc.). The various auction applications 422 may also provide a number of features in support of such auction-format offers, such as a reserve price feature whereby a seller may specify a reserve price in connection with an offer and a proxy-bidding feature, whereby a bidder may invoke automated proxy bidding. The auction-format offer in any format may be published in any virtual or physical marketplace medium and may be considered the point of sale. In an additional embodiment, the client user may use the navigation application(s) to find the auction-format offer.

The marketplace applications 410 may include one or more personalization applications 424. The personalization application(s) 424 may allow third parties to personalize various aspects of their interactions with the system 112. For example the third party may, utilizing an appropriate personalization application 424, create a personalized reference page at which information regarding transactions to which the third party is (or has been) a party may be viewed. Further, the personalization application(s) 424 may enable a third party to personalize products and other aspects of their interactions with the system 112 and other parties, or to provide other information, such as relevant business information about themselves.

The marketplace applications 410 may include one or more internationalization applications 426. In one embodiment, the network-based system 112 may support a number of marketplaces that are customized, for example, for specific geographic regions. A version of the system 112 may be customized for the United Kingdom, whereas another version of the system 112 may be customized for the United States. Each of these versions may operate as an independent marketplace, or may be customized (or internationalized) presentations of a common underlying marketplace.

The marketplace applications 410 may include one or more reputation applications 428. The reputation applications 428 allow parties that transact utilizing the network-based system 112 to establish, build, and maintain reputations, which may be made available and published to potential trading partners. Consider that where, for example, the network-based system 112 supports person-to-person trading, users may have no history or other reference information whereby the trustworthiness and credibility of potential trading partners may be assessed. The reputation applications 428 allow a user, for example through feedback provided by other transaction partners, to establish a reputation within the network-based system 112 over time. Other potential trading partners may then reference such a reputation for the purposes of assessing credibility and trustworthiness. The feedback for each seller is placed in respective feedback tables 236.

In order to allow listings and/or products, available via the network-based system 112, to be published in a visually informing and attractive manner, the marketplace applications 410 may include one or more imaging applications 430. Sellers may upload images for inclusion within offer listings using J2ME, MMS, and WAP or other microbrowsers. An imaging application 430 also operates to incorporate images within viewed offered listings. The imaging application 430 may also operate to publish the identifier 166 associated with the listing 164 on the display 162. The imaging applications 430 may also support one or more promotional features, such as image galleries that are presented to potential buyers. For example, sellers may pay an additional fee to have an image included within a gallery of images for promoted offers.

The marketplace applications 410 may include one or more offer creation applications 432. The offer creation applications 432 allow sellers conveniently to author products pertaining to goods or services that they wish to transact via the system 112. Offer management applications 434 allow sellers to manage offers, such as goods, services, or donation opportunities. Specifically, where a particular seller has authored and/or published a large number of products, the management of such products may present a challenge. The offer management applications 434 provide a number of features (e.g., auto-reproduct, inventory level monitors, etc.) to assist the seller in managing such products. One or more post-offer management applications 436 also assist sellers with a number of activities that typically occur post-offer. For example, upon completion of an auction facilitated by one or more auction applications 422, a seller may wish to leave feedback regarding a particular buyer. To this end, a post-offer management application 436 may provide an interface to one or more reputation applications 428, so as to allow the seller conveniently to provide feedback regarding multiple buyers to the reputation applications 428.

The marketplace application(s) 410 may also further include one or more escrow application(s) 446 and the escrow account 450. In certain environments, the escrow application(s) 446 of the marketplace applications 410 may replace the funds release application(s) 146 of the payment applications 132 in the system of FIG. 1 and in the interaction chart of FIG. 4. In addition, the escrow account 450 of the marketplace applications 410 may replace the holding account 150 of the payment applications 132 in some environments. The escrow account 450 may be a transaction-specific escrow account, and/or the escrow account 450 may be a seller-specific escrow account for each pending seller transaction. In either instance, the seller may associate collateral with the holding account directly or through another seller account associated with the payment application(s) 452.

A risk model 447 of the escrow application(s) 446 may operate in a manner similar to the risk model 147 of the funds release application(s) 146, as previously described, to assess risks associated with each transaction. The risk model 447 may likewise, based on the information received from various sources (e.g., database tables 200 of FIG. 3), determine the risk level of the payment transaction using a scoring algorithm. The risk model 447 may likewise consider factors such as the seller-specific criteria, the buyer-specific criteria, and/or the transaction-specific criteria, previously discussed herein. The risk model 447 may indicate, for example, that service should be denied to a participant (buyer or seller) due to high likelihood of fraud, may recommend, for example, a service fee for processing the payment transaction, payment instruments to be used by either the buyer or the seller, approval by buyer before release of funds from the escrow account 450, and/or restrictions (e.g., time or amount held) on disbursing funds to the seller.

The payment application (s) 452 may replace the payment application(s) 132 of the network-based system 112 of FIG. 1 in certain environments. The payment application(s) 452 may include the payment transfer module 142, the fraud prevention application(s) 144, and the dispute resolution application(s) 148, as previously described.

In other embodiments, a seller and/or a buyer is able to dynamically choose between a variable payment option as described in the system of FIGS. 1 and 2, and an escrow option as described in the system of FIG. 5. The ability to choose may be based upon seller attributes, buyer attributes, or other criteria. The seller may choose to offer one or both options, e.g., in competitive environments, and the buyer may then choose or agree to the payment option used.

Even though the context of this description is with regard to marketplace applications, it is to be understood by those of skill in the art that the described subject matter may also be applicable to other types of applications for various types of transactions. The transactions may include those between a single seller and a single buyer or may include those between a single seller and multiple buyers, and may include selling a catalog-type product, or even a more unique product.

Computer System

Figure 6:
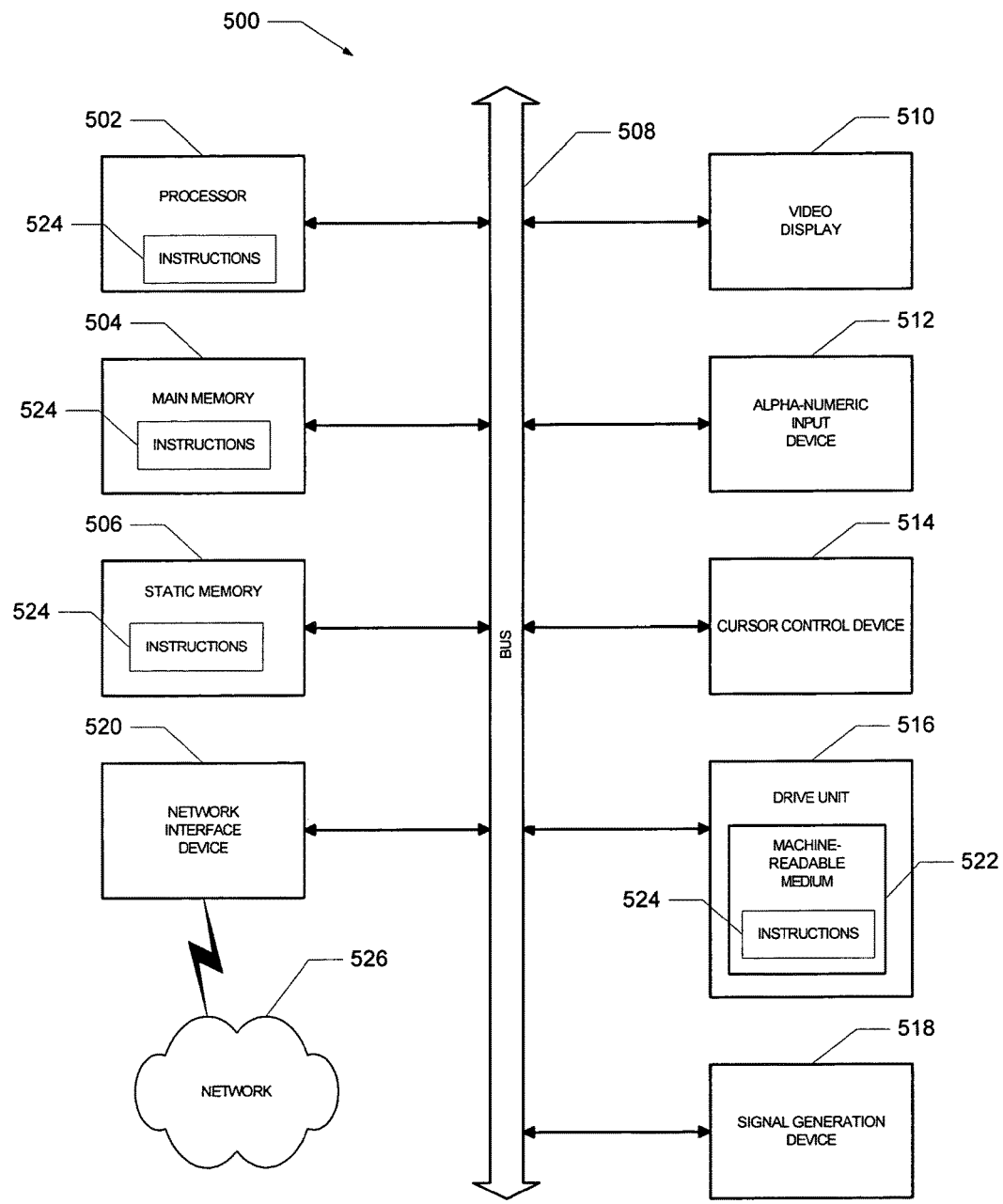
FIG. 6 illustrates a diagrammatic representation of a machine in the form of a computer system within which a set of instructions, for causing the machine to perform any one or more of the methodologies discussed herein, may be executed, according to an example embodiment.

FIG. 6 shows a diagrammatic representation of a machine in the example form of a computer system 500 within which a set of instructions, for causing the machine to perform any one or more of the methodologies discussed herein, may be executed. In alternative embodiments, the machine operates as a standalone device or may be connected (e.g., network) to other machines. In a network deployment, the machine may operate in the capacity of a server or a client user machine in server-client user network environment, or as a peer machine in a peer-to-peer (or distributed) network environment. The machine may be a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a television, television cable a pager, a personal trusted device, a web appliance, a network router, switch or bridge, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The instructions 524 may also reside, completely or at least partially, within the main memory 504, the static memory 506, and/or within the processor 502 during execution thereof by the computer system 500. The main memory 504 and the processor 502 also may constitute machine-readable media.

The instructions 524 may further be transmitted or received over a network 526 via the network interface device 520.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 to 6 are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. § 1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, embodiments describe a method and a system to automatically transfer payment to a third party, for example, as part of a request from a network-based device. Although embodiments of the present invention have been described with reference to specific example embodiments, it will be evident that various modifications and changes may be made to these embodiments without departing from the broader spirit and scope of embodiments as expressed in the subjoined claims.

What is claimed is:

1. A computer system to transfer a payment to a client machine of a seller of a network-based transaction in a network-based commerce system, the computer system comprising:
   one or more hardware processors;
   a database that includes a transaction-specific table of the seller that includes records for network-based transactions and a velocity of trade table of the seller indicative of a volume of trade of the seller on the network-based commerce system; and
   a non-transitory machine-readable medium storing instructions that, in response to being executed by the one or more hardware processors, causes the one or more hardware processors to perform operations comprising:
      receiving information for a current network-based transaction;
      storing the received information in the transaction-specific table of the database along with historical information previously stored in the database for previous network-based transactions in the network-based commerce system;
      tracing, based on the volume of trade in the velocity of trade table of the database, further network-based transactions in the network-based commerce system of the seller on a continuous basis;
      determining a velocity of the further network-based transactions;
      during processing of a payment transaction of the current network-based transaction:
         retrieving a portion of the information for the network-based transaction and a portion of the historical information from the database;
         retrieving from a risk analysis provider, data specific to a seller, the data including a credit rating of the seller;
         performing a risk evaluation using a scoring algorithm, the risk evaluation being based on the retrieved data specific to the seller;
         determining, using at least one of the one or more hardware processors, timing for release of a portion of funds from a holding account based on the risk evaluation;
         dynamically updating the determined timing based on the traced transactions of the seller and the velocity of the further network-based transactions; and
         determining a timing restriction of payment of at least the portion of the funds from the holding account to the seller based on the risk evaluation and the updated determined timing; and
      executing the payment transaction in the network-based commerce system, wherein the executing includes restricting payment of at least the portion of the funds according to the timing restriction to reduce risk associated with the current network-based transaction.

2. The system of claim 1, wherein the dynamic update of the determined timing is further based on an increase in an amount of funds held in the holding account.

3. The system of claim 1, wherein the operations further comprise determining he portion of the funds to be released based on the determined timing.

4. The system of claim 1, wherein the operations further comprise minimizing a time the funds are held based on a collateral provided by the seller.

5. The system of claim 1, wherein the operations further comprise minimizing an amount of time the funds are held based on a security proxy provided by a client machine of the seller.

6. The system of claim 5, wherein the security proxy comprises a selection from a group consisting of a valid social security number, financial services provider account information, and a particular amount of cash.

7. The system of claim 1, wherein the risk associated with the current network-based transaction includes a risk of failure to provide a product, a risk of providing a defective product, or a risk of providing a misrepresented product.

8. The system of claim 1, wherein the operations further comprise dynamically updating the determined timing as an increase in a rate at which funds held in the holding account are released responsive to a determination of an increase in velocity of trade of the seller.

9. A method implemented in a computer system to transfer a payment to a client machine of a seller of a network-based transaction in a network-based commerce system, the method comprising:
   receiving, by one or more processors, information for a current network-based transaction;
   storing, by the one or more processors, the received information in the transaction-specific table of a database along with historical information previously stored in the database for previous network-based transactions in the network-based commerce system, wherein the database includes a transaction-specific table of the seller that includes records for network-based transactions and a velocity of trade table of the seller indicative of a volume of trade of the seller on the network-based commerce system;
   tracing, by the one or more processors, based on the volume of trade in the velocity of trade table of the database, further network-based transactions in the network-based commerce system of the seller on a continuous basis;
   determining, by the one or more processors, a velocity of the further network-based transactions;
   during processing of a payment transaction of the current network-based transaction:

retrieving, by the one or more processors, a portion of the information for the network-based transaction and a portion of the historical information from the database;

retrieving, by the one or more processors, from a risk analysis provider, data specific to a seller, the data including a credit rating of the seller;

performing, by the one or more processors, a risk evaluation using a scoring algorithm, the risk evaluation being based on the retrieved data specific to the seller;

determining, by the one or more processors, timing for release of a portion of funds from a holding account based on the risk evaluation;

dynamically updating, by the one or more processors, the determined timing based on the traced transactions of the seller and the velocity of the further network-based transactions; and determining, by the one or more processors, a timing restriction of payment of at least the portion of the funds from the holding account to the seller based on the risk evaluation and the updated determined timing; and executing, by the one or more processors, the payment transaction in the network-based commerce system, wherein the executing includes restricting payment of at least the portion of the funds according to the timing restriction to reduce risk associated with the current network-based transaction.

10. The method of claim 9, wherein the dynamically updating is further based on an increase in an amount of funds held in the holding account.

11. The method of claim 9, further comprising determining at least the portion of the funds to be released based on the determined timing.

12. The method of claim 9, wherein the determining the timing for release comprises minimizing an amount of time the funds are held based on a collateral provided by the seller.

13. The method of claim 9, wherein the determining the timing for release comprises minimizing a time the funds are held based on a security proxy provided by a client machine of the seller.

14. The method of claim 13, wherein the security proxy comprises a selection from a group consisting of a valid social security number, financial services provider account information, and a particular amount of cash.

15. The method of claim 9, wherein the risk associated with the current network-based transaction includes a risk of failure to provide a product, a risk of providing a defective product, or a risk of providing a misrepresented product.

16. The method of claim 9, further comprising dynamically updating the determined timing as an increase in a rate at which funds held in the holding account are released responsive to a determination of an increase in velocity of trade of the seller.

17. A non-transitory machine-readable medium storing instructions that, in response to being executed by one or more processors of a machine, causes the one or more processors to perform operations comprising:

receiving information for a current network-based transaction;

storing the received information in the transaction-specific table of a database along with historical information previously stored in the database for previous network-based transactions in a network-based commerce system, wherein the database includes a transaction-specific table of a seller that includes records for network-based transactions and a velocity of trade table of the seller indicative of a volume of trade of the seller on the network-based commerce system;

tracing, based on the volume of trade in the velocity of trade table of the database, further network-based transactions in the network-based commerce system of the seller on a continuous basis;

determining a velocity of the further network-based transactions;

during processing of a payment transaction of the current network-based transaction:

retrieving a portion of the information for the network-based transaction and a portion of the historical information from the database;

retrieving from a risk analysis provider, data specific to a seller, the data including a credit rating of the seller;

performing a risk evaluation using a scoring algorithm, the risk evaluation being based on the retrieved data specific to the seller;

determining, by a hardware processor, timing for release of a portion of funds from a holding account based on the risk evaluation;

dynamically updating the determined timing based on the traced transactions of the seller and the velocity of the further network-based transactions; and determining a timing restriction of payment of at least the portion of the funds from the holding account to the seller based on the risk evaluation and the updated determined timing; and executing the payment transaction in the network-based commerce system, wherein the executing includes restricting payment of at least the portion of the funds according to the timing restriction to reduce risk associated with the current network-based transaction.

18. The machine-readable medium of claim 17, wherein the determining the timing for release comprises minimizing an amount of time the funds are held based on a collateral provided by the seller.

19. The machine-readable medium of claim 17, wherein:
the determining the timing for release comprises minimizing a time the funds are held based on a security proxy provided by the seller, and
the security proxy comprising a selection from a group consisting of a valid social security number, financial services provider account information, and a particular amount of cash.

20. The machine-readable medium of claim 17, wherein the risk associated with the current network-based transaction includes a risk of failure to provide a product, a risk of providing a defective product, or a risk of providing a misrepresented product.

* * * * *